United States Patent
Asokan

(10) Patent No.: US 8,447,255 B2
(45) Date of Patent: May 21, 2013

(54) VARIABLE IMPEDANCE MATCHING NETWORK AND METHOD FOR THE SAME

(75) Inventor: Ramanathan Asokan, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 596 days.

(21) Appl. No.: 12/259,472

(22) Filed: Oct. 28, 2008

(65) Prior Publication Data

US 2010/0105425 A1    Apr. 29, 2010

(51) Int. Cl.
*H04B 1/06*        (2006.01)

(52) U.S. Cl.
USPC .......... 455/273; 455/333; 455/334; 455/338; 455/339; 455/340; 343/850; 343/851; 343/860; 343/861; 333/17.3; 333/32

(58) Field of Classification Search
None
See application file for complete search history.

(56) References Cited

U.S. PATENT DOCUMENTS

| | | | |
|---|---|---|---|
| 2002/0101907 | A1 | 8/2002 | Dent et al. |
| 2004/0248529 | A1* | 12/2004 | Park .......................... 455/127.1 |
| 2006/0183443 | A1 | 8/2006 | Chang et al. |
| 2008/0076476 | A1 | 3/2008 | Rofougaran |
| 2008/0129610 | A1 | 6/2008 | Tsfati et al. |
| 2008/0182540 | A1* | 7/2008 | Rofougaran .................. 455/280 |
| 2009/0149136 | A1* | 6/2009 | Rofougaran .................... 455/77 |

FOREIGN PATENT DOCUMENTS

| | | |
|---|---|---|
| EP | 1 936 818 | 6/2008 |
| WO | 2004/008634 | 1/2004 |

OTHER PUBLICATIONS

International Search Report and Written Opinion for corresponding Application No. PCT/US2009/041863 mail Jul. 31, 2009.

* cited by examiner

*Primary Examiner* — Zhiyu Lu

(74) *Attorney, Agent, or Firm* — Renner, Otto, Boisselle & Sklar, LLP

(57) ABSTRACT

An improved variable matching network for use in a multi-band, multi-mode communications device provides dynamic, fine-tune impedance matching based on current operational conditions associated with a given signal. In one embodiment, gross parameters are selected based on one or more of the operational conditions. Delta parameters are provided using an optimization algorithm based on one or more of the operational conditions. And the gross and delta parameters are combined to obtain overall matching parameters that dynamically fine-tune discrete matching circuitry.

16 Claims, 6 Drawing Sheets

VARIABLE IMPEDANCE MATCHING NETWORK AND METHOD FOR THE SAME

TECHNICAL FIELD OF THE INVENTION

The present invention relates generally to antennas in communication devices and, more particularly, to impedance matching of an antenna in a multi-band, multi-mode communication device, such as a mobile phone.

BACKGROUND

Antenna impedance matching is a well-known aspect of RF design. Impedance matching networks are used in a variety of different communications devices for matching the radio portion to one or more antennas. Matching networks operate to minimize insertion loss and provide high receiver performance. Typically, the matching network of a communications device, such as a mobile phone, is included in the RF front-end module of the radio circuit included in the device. The RF front-end module may be defined as the circuitry located between an antenna port and a transceiver of the device.

The emergence of multi-band, multi-mode communications devices has introduced new challenges to the design of the RF front-end module and the matching networks included therein. As the number of frequency bands and radio access technologies (RATs) (also referred to in the art as communication standards) accommodated by a communications device increases, so does the complexity and cost of the RF front-end module within the device. Competing with the increasing demands on the radio portion of the device is the constant push for miniaturization of communications devices to satisfy the convenience and desires of consumers.

For example, mobile phones covering triple-band WCDMA (Wideband Code Division Multiple Access) and quad-band GSM (Global System for Mobile Communications) technologies with one antenna have been developed. However, the front-end module of such a multi-band, multi-mode device requires a large number of RF components to handle the numerous RF signal paths needed to cover all GSM and WCDMA frequency bands for both transmitting and receiving (e.g., one RF signal path for each frequency band covered by each RAT. To add further complexity, in order to provide maximum power transfer, the antenna impedance must be matched to each of the numerous RF signal paths.

FIGS. 5 and 6 illustrate conventional approaches to impedance matching in multi-band, multi-mode communications devices. FIG. 5 illustrates a conventional radio circuit that places an independent matching circuit on each RF signal path. The radio circuit of FIG. 5 provides perfect matching by providing an independent matching circuit for each signal path that is individually tailored to the specific frequency band, RAT, and TX/RX mode associated with the respective signal path. However, this increases the cost and complexity of the front-end module. The conventional radio circuit shown in FIG. 6 greatly reduces the number of RF components by including one common matching circuit. However, the common matching circuit of FIG. 6 provides fixed matching and thereby, compromises its performance across all frequency bands, RATs, and TX/RX modes. As a result, the radio circuit of FIG. 6 fails to provide the desired maximum power transfer.

SUMMARY

In accordance with an aspect of the invention, a variable matching network for use in a multi-band, multi-mode communications device is provided that is capable of providing dynamic fine-tune impedance matching between the antenna and each signal path of a radio circuit within the communications device based on the current operational conditions.

According to one embodiment of the invention, a variable matching network for use in a multi-band, multi-mode communications device is provided. The variable matching network includes a gross parameter selector configured to select a first set of parameters from a plurality of predefined gross parameters based on one or more operational conditions associated with a given signal. The variable matching network also includes a matching optimizer configured to obtain a second set of parameters using an optimization algorithm based on one or more of the operational conditions. The variable matching network further includes a parameter combiner configured to obtain overall matching parameters based on the first and second sets of parameters. And the variable matching network includes discrete matching circuitry configurable based on the overall matching parameters to provide dynamic, fine-tune impedance matching.

In accordance with an aspect of the variable matching network, the one or more operational conditions on which the first set of parameters is based includes a selected radio access technology, a selected frequency band, and a selected one of a transmitting mode or a receiving mode.

In accordance with another aspect of the variable matching network, the one or more operational conditions on which the second set of parameters is based includes information pertaining to signal quality and a selected one of a transmitting mode or a receiving mode.

According to an aspect of the variable matching network, the signal quality information includes at least one of an uplink signal quality or a downlink signal quality.

According to another aspect of the variable matching network, the matching optimizer compares the uplink signal quality and the downlink signal quality to determine which link is weaker, and optimizes the second set of parameters based on the signal quality of the weaker link.

In accordance with yet another aspect of the variable matching network, at least one predefined gross parameter is assigned to each possible combination of frequency band, radio access technology, and transmitting/receiving mode.

In accordance with still another aspect of the variable matching network, the gross parameter selector selects the first set of parameters based on the transmitting mode for one time period and selects the first set of parameters based on the receiving mode for a next time period.

According to one aspect of the variable matching network, the operational conditions are continuously updated.

According to another embodiment of the invention, a method of providing fine-tune impedance matching at an antenna port of a multi-band, multi-mode communications device is provided. The method includes receiving operational conditions associated with a given signal and selecting a first set of parameters from a plurality of predefined gross parameters based on one or more of the operational conditions. The method also includes obtaining a second set of parameters using an optimization algorithm based on one or more of the operational conditions and obtaining overall matching parameters based on the first and second sets of parameters. The method further includes dynamically tuning discrete matching circuitry based on the overall matching parameters.

In accordance with one aspect, the method provides that the one or more operational conditions on which the first set of parameters is based includes a selected radio access technology, a selected frequency band, and a selected one of a transmitting mode or a receiving mode.

In accordance with another aspect, the method provides that the one or more operational conditions on which the second set of parameters is based includes information pertaining to signal quality and a selected one of a transmitting mode or a receiving mode.

According to one aspect, the method provides that the signal quality information includes at least one of an uplink signal quality or a downlink signal quality.

According to another aspect, the method provides that obtaining a second set of parameters includes comparing the uplink signal quality and the downlink signal quality to determine which link is weaker and optimizing the second set of parameters based on the signal quality of the weaker link.

According to still another aspect, the method provides that at least one predefined gross parameter is assigned to each possible combination of frequency band, radio access technology, and transmitting/receiving mode.

In accordance with one aspect, the method provides that selecting a first set of parameters includes for one time period, selecting the first set of parameters based on the transmitting mode, and for a next time period, selecting the first set of parameters based on the receiving mode.

In accordance with another aspect, the method provides that the operational conditions are continuously updated.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
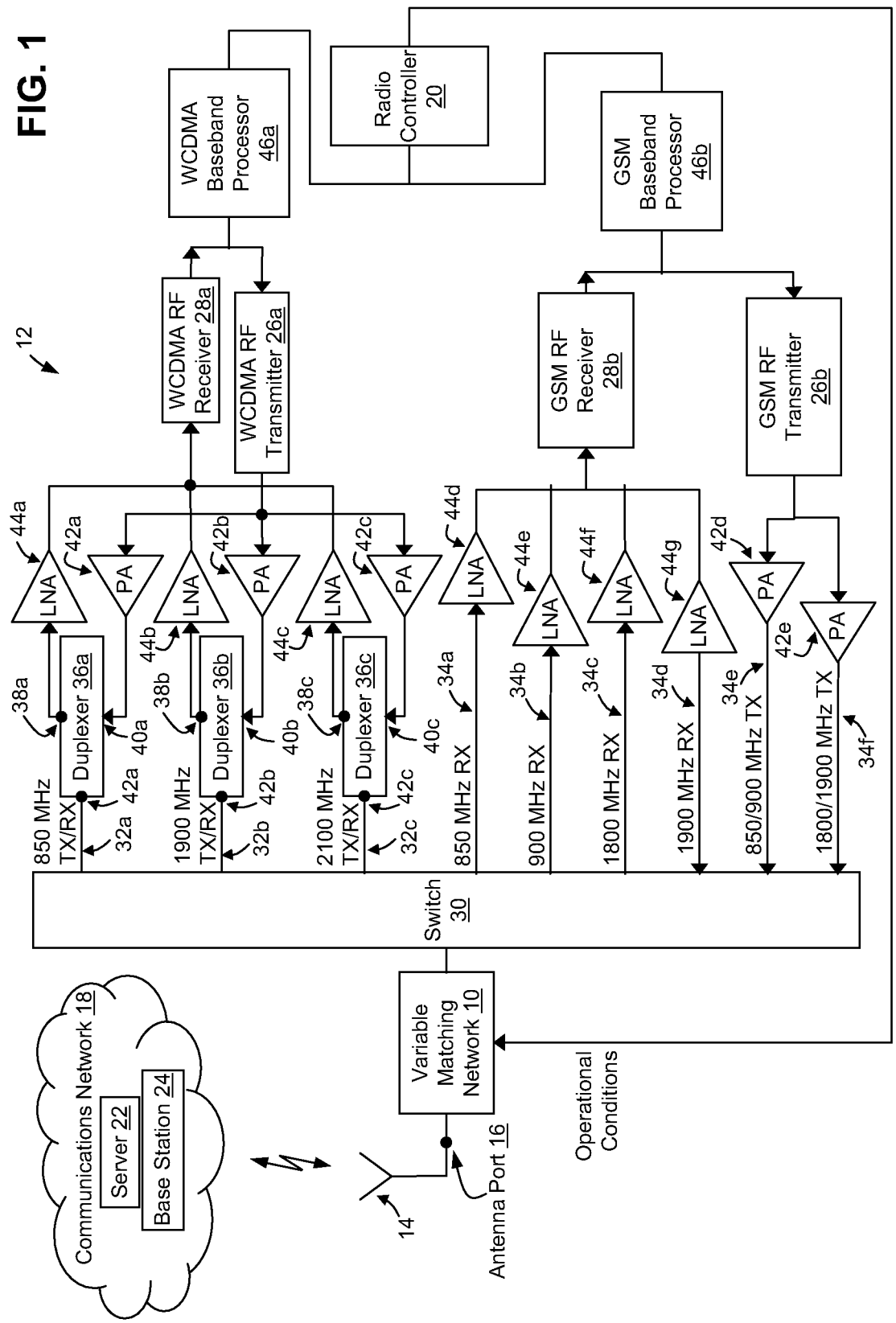
FIG. 1 is a schematic block diagram of an exemplary radio circuit that includes a variable matching network in accordance with an embodiment of the present invention.

Embodiments will now be described with reference to the drawings, wherein like reference numerals are used to refer to like elements throughout. It will be understood that the figures are not necessarily to scale.

In the present document, some embodiments are described primarily in the context of a mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Referring initially to FIG. 1, shown is an exemplary radio circuit 12 that includes a variable matching network 10 in accordance with an exemplary embodiment of the present invention. The radio circuit 12 may be included in an electronic device, such as, for example, a mobile telephone (to be discussed with reference to FIG. 4 below).

The variable matching network 10 is operatively coupled to the antenna 14 via an antenna port 16. The antenna 14 supports communications activity and other networking tasks of the radio circuit 12. In one embodiment, the antenna 14 is configured to receive an inbound signal from, or transmit an outbound signal to, a communications network 18, such as a mobile telephone network. In the exemplary embodiment, the same antenna 14 is used for the communication activity of all radio access technologies (RATs) and in all frequency bands for which the radio circuit 12 is designed to operate.

The communications network 18 decides which RAT and which frequency band to use in a given area, at a given time, and/or for a given communications device, based on, e.g., coverage, capacity, service requirements, etc. For example, if, in the middle of making a call, a caller moves from a GSM coverage area to a WCDMA coverage, the communications network 18 may "hand over" the GSM-initiated call to a WCDMA system so that the call may continue uninterrupted. The communications network 18 sends the selected frequency band and RAT information to a radio controller 20 via the antenna 14. This information may be continuously updated by the communications network 18.

In the illustrated embodiment, the communications network 18 includes a server 22 (or servers) for managing calls placed by and destined to the radio circuit 12, transmitting data to the radio circuit 12, and carrying out any other support functions (including, for example, providing frequency band, RAT, and signal quality information). The server 22 may communicate with the radio circuit 12 via a transmission medium. The transmission medium may be any appropriate device or assembly, including, for example, a communications base station 24 of the network 18 (e.g., a cellular service tower, or "cell" tower).

In one embodiment, the communications network 18 may send signal quality information to the radio controller 20 via the antenna 14. For example, the signal quality information may specify an uplink signal quality (e.g., quality of a transmit signal) that is estimated by the base station 24. Similarly, the radio controller 20 may send signal quality information to the base station 24 via the antenna 14 specifying a downlink signal quality (e.g., quality of a receive signal).

In another embodiment, the uplink signal quality is derived from certain commands sent by the base station 24 to the radio controller 20. As is conventional, the base station 24 provides several commands to the radio controller 20 based on the estimated uplink signal quality. These commands direct the radio controller 20 to modify certain parameters, such as, e.g., power control, code rate, etc. For example, a power control command may direct the radio controller 20 to increase the transmit power of the radio circuit 12 to achieve better performance. As is will be appreciated, a high transmit power produces a higher signal power at the receiver (e.g., higher signal-to-noise ratio (SNR)), which reduces the bit error rate (BER) of the communication link and allows transmission at a higher data rate. One embodiment of the present invention utilizes these base station commands (e.g., power control, code rate, etc.) to derive the uplink signal quality. For the sake of brevity, further detail regarding how to derive the uplink signal quality will not be provided. It will be apparent to one of ordinary skill in the art of radio communications how to derive an uplink signal quality measurement from the information received from base station 24.

As shown in FIG. 1, the radio controller 20 may send a control signal indicating the current "operational conditions" of the radio circuit 12 to the variable matching network 10. These operational conditions may include information received from the communications network 18, such as, e.g., RAT, frequency band, signal quality, etc. As will be described in greater detail with reference to FIG. 2 below, the variable matching network 10 is configured to dynamically fine-tune the impedance matching of the antenna 14 based on the operational conditions received from the radio controller 20.

FIG. 1 illustrates an exemplary embodiment of the present invention in which the radio circuit 12 may operate in a global system for mobile communications (GSM) mode or a wideband code division multiple access (WCDMA) mode. In the GSM mode, the radio circuit 12 may cover three GSM frequency bands on both the receive side and the transmit side: 850 MHz, 1900 MHz, and 2100 MHz. In the WCDMA mode, the radio circuit 12 may cover four WCDMA frequency bands on both the receive side and the transmit side: 850 MHz, 900 MHz, 1800 MHz, and 1900 MHz. However, the present invention is not limited to any RAT or frequency band, or any number of or combination of RATs or frequency bands. For example, transmitter, receiver, and/or transceiver types for interaction with the communications network 18 and/or another type of broadcasting network may include, but are not limited to, Enhanced Data Rates for GSM Evolution (EDGE), Universal Mobile Telecommunications System (UMTS), Long Term Evolution (LTE), code division multiple access (CDMA), general packet radio service (GPRS), digital video broadcasting-handheld (DVB-H), integrated services digital broadcasting (ISDB), etc., as well as advanced versions of these standards. The frequency bands discussed herein may include any frequency bands, including the 700 MHz band to be introduced for WCDMA technology in the near future.

In the illustrated embodiment, the radio circuit 12 includes two radio frequency (RF) transmitters 26 and two RF receivers 28 for exchanging signals with the communications network 18 via the antenna 14. Each of the RF transmitters 26 and RF receivers 28 may include an RF ASIC (application specific integrated circuit) (not shown) for carrying out the transmit and receive functions, respectively. As shown, RF transmitter 26a and RF receiver 28a are configured for WCDMA technology. And RF transmitter 26b and RF receiver 28b are configured for GSM technology. In one embodiment, the RF transmitter 26a and RF receiver 28a may be combined into one WCDMA transceiver. And RF transmitter 26b and RF receiver 28b may be combined into one GSM transceiver. In another embodiment, the RF transmitters 26 and RF receivers 28 may be included in a single multi-mode RF transceiver that is designed to both transmit and receive signals according to multiple RATs.

The radio circuit 12 may include a switch 30 that is selectively operable to connect the variable matching network 10, and thereby the antenna port 16, to the RF transmitters 26 and the RF receivers 28 via signal paths 32 and 34. The switch 30 may be an antenna switch module that includes one or more multiplexers and appropriately configured filters. In one embodiment, the switch 30 may be a SP9T (single pole, nine throw) switch for selectively connecting the antenna port 16 to one of the nine signal paths 32, 34.

The switch 30 selectively connects the variable matching network 10 to one of the signal paths 32, 34 depending on the active RAT (e.g., the communications standard being utilized by the communications network 18 to transmit and/or receive a given signal) and the active frequency band (e.g., the frequency band within which the communications network 18 is transmitting and/or receiving a given signal). The active RAT and frequency band information may be provided to the switch 30 in the form of a control signal from the radio controller 20. Each of the signal paths 32 and 34 may be designed to transmit and/or receive signals within a specific frequency band belonging to a specific RAT. The RAT assigned to each signal path 32/34 corresponds to the technology being used by the RF transmitter 26 and/or RF receiver 28 associated with the path 32/34.

In the illustrated embodiment, if the active RAT is GSM, the switch 30 selectively connects the antenna port 16 to one of the signal paths 34 based on the active frequency band and whether a given signal is being transmitted (e.g., a transmit signal) or is being received (e.g., a receive signal). The GSM signal paths 34 are half-duplex paths in that each of the signal paths 34 carry only transmit signals or only receive signals. During GSM operation, the switch 30 receives a control signal from the radio controller 20 that directs the switch 30 as to whether the radio circuit 12 is operating in a transmit mode (e.g., transmitting a signal via the antenna 14 to the communications network 18) or a receive mode (e.g., receiving a signal from the communications network 18 via the antenna 14). RX signal path 34a carries receive signals in the 850 MHz frequency band. RX signal path 34b carries receive signals in the 900 MHz frequency band. RX signal path 34c carries receive signals in the 1800 MHz frequency band. RX signal path 34d carries receive signals in the 1900 MHz frequency band. TX signal path 34e carries transmit signals in the 850 MHz and/or 900 MHz frequency band. And TX signal path 34f carries transmit signals in the 1800 MHz and/or 1900 MHz frequency band.

If, on the other hand, the active RAT is WCDMA, the switch 30 selectively connects the antenna port 16 to one of the signal paths 32 depending only on the active frequency band. In the illustrated example, the WCDMA signal paths 32 are full-duplex paths in that each of the signal paths 32 may carry both transmit and receive signals at the same time. TX/RX signal path 32a carries signals in the 850 MHz frequency band. TX/RX signal path 32b carries signals in the 1900 MHz frequency band. And TX/RX signal path 32c carries signals in the 2100 MHz frequency band. As will be appreciated, as long as the transmit and receive signals occupy disjointed frequency channels, both signals may coexist on a single TX/RX signal path without interfering with each other. Each frequency band includes multiple frequency channels, as is conventional. For example, WCDMA frequency bands are separated into multiple 5 MHz channels.

In the illustrated embodiment, each of the TX/RX signal paths 32 are coupled to a duplexer 36. Each duplexer 36 multiplexes two ports 38, 40 onto one port 42 to allow simultaneous transmission of the receive signals and the transmit signals along each of the TX/RX signal paths 32. Each duplexer 36 may be designed to operate within the frequency band associated with the corresponding TX/RX signal path 32. Each duplexer 36 may include one or more filters (not shown) that are designed to separate the receive signals from the transmit signals at the ports 38, 40 and allow noise-free transfer of the signals over one common antenna. The use of duplexers 36 reduces the number of TX/RX ports in the switch 30 because each WCDMA frequency band requires only one TX/RX signal path 32 at the switch 30 to transfer signals received by the antenna 14 to the receiver RF 28a and to transfer signals from the transmitter RF 26a to the antenna 14 for transmission. The duplexers 36 may be designed to isolate transmit and receive signals from each other using known methods. The frequency range supported by each duplexer 36 should not exceed the frequency separation between the transmit and receive signals passing through the duplexer 36. In at least this manner, the duplexers 36 may filter out noise on associated TX paths occurring within the frequency range of associated RX paths.

According to the illustrated example, signal paths 34 are not connected to duplexers in order to avoid cross-interference between signals in certain circumstances. For example, as is known in the art, the GSM 1900 MHz TX band may overlap with the GSM 1800 MHz RX band. As a result, transmit and receive signals having a frequency within the overlapping range between these bands may be coupled and/or bonded together if the duplexer cannot provide high isolation. The radio circuit 12 avoids this issue by including separate signal paths 34a, 34b, 34c, and 34d to cover each frequency band on the receive side and separate signal paths 34e and 34f to cover two sets of frequency bands on the transmit side.

The radio circuit 12 may include power amplifiers (PAs) 42 and/or low noise amplifiers (LNAs) that are individually designed to amplify signals within the frequency band assigned to the signal path 32/34 to which the amplifier 42/44 is coupled. In the illustrated embodiment, each of the GSM signal paths 34a, 34b, 34c, and 34d are directly coupled to LNAs 44d, 44e, 44f, and 44g, respectively. And signal paths 34e and 34f are directly coupled to PAs 42d and 42e, respectively. On the WCDMA side, TX/RX signal path 32a is coupled to both LNA 44a and PA 42a via duplexer 36a. TX/RX signal path 32b is coupled to both LNA 44b and PA 42b via duplexer 36b. And TX/RX signal path 32c is coupled to both LNA 44c and PA 42c via duplexer 36c.

Each of the PAs 42 amplifies transmit signals from the transmitters 26 before the signals are transmitted via the antenna 14. And each of the LNAs 44 amplifies receive signals before the signals are sent to the RF receivers 28. As shown in FIG. 1, PAs 42a, 42b, and 42c are coupled to WCDMA RF transmitter 26. And LNAs 44a, 44b, and 44c are coupled to WCDMA RF receiver 28a. PAs 42d and 42e are coupled to GSM RF transmitter 26b. And LNAs 44d, 44e, 44f, and 44g are coupled to GSM RF receiver 28b.

The radio circuit 12 may include one or more baseband processors 46 for modulating and/or demodulating a given signal according to the active RAT. Each RAT may require a specific modulation technique for providing a signal that can be easily accommodated by the communication network 18. The modulation process includes translating a message signal to a new spectral location by varying certain parameters of the signal, such as its amplitude, phase and/or frequency, so that a modulated signal conveys the message or information. For the sake of brevity, the specific modulation technique used for each RAT will not be discussed in greater detail. However, it will be apparent to a person having ordinary skill in the art of mobile communication systems how to implement the required modulation technique for each communication standard.

In the illustrated embodiment, baseband processor 46a is designed for WCDMA technology and baseband processor 46b is designed for GSM technology. As shown in FIG. 1, WCDMA baseband processor 46a is operatively connected to WCDMA RF transmitter 26a and WCDMA RF receiver 28a. And GSM baseband processor 46b is operatively connected to GSM RF transmitter 26b and GSM RF receiver 28b. In one embodiment, baseband processors 46 may be a single multi-mode baseband processor that is designed to handle multiple RATs. For example, based on the frequency band and RAT information received from the communications network 18, a multi-mode baseband processor is able to apply the required modulation (e.g., linear, small signal polar, open loop polar, etc.) to all signals, regardless of which RAT (e.g., WCDMA, GSM, etc.) is being used by the communication network 18.

The baseband processors 46 are operatively connected to the radio controller 20. The radio controller 20 may provide control signals to the baseband processors 46 based on information received from the communications network 18, such as, e.g., which RAT and frequency band may be used to transmit or receive signals. The baseband processors 46 may provide signal processing information to the radio controller 20. Based on the information from the processors 46, the radio controller 20 may, for example, provide an estimate of the downlink signal quality and/or the uplink signal quality.

Figure 2:
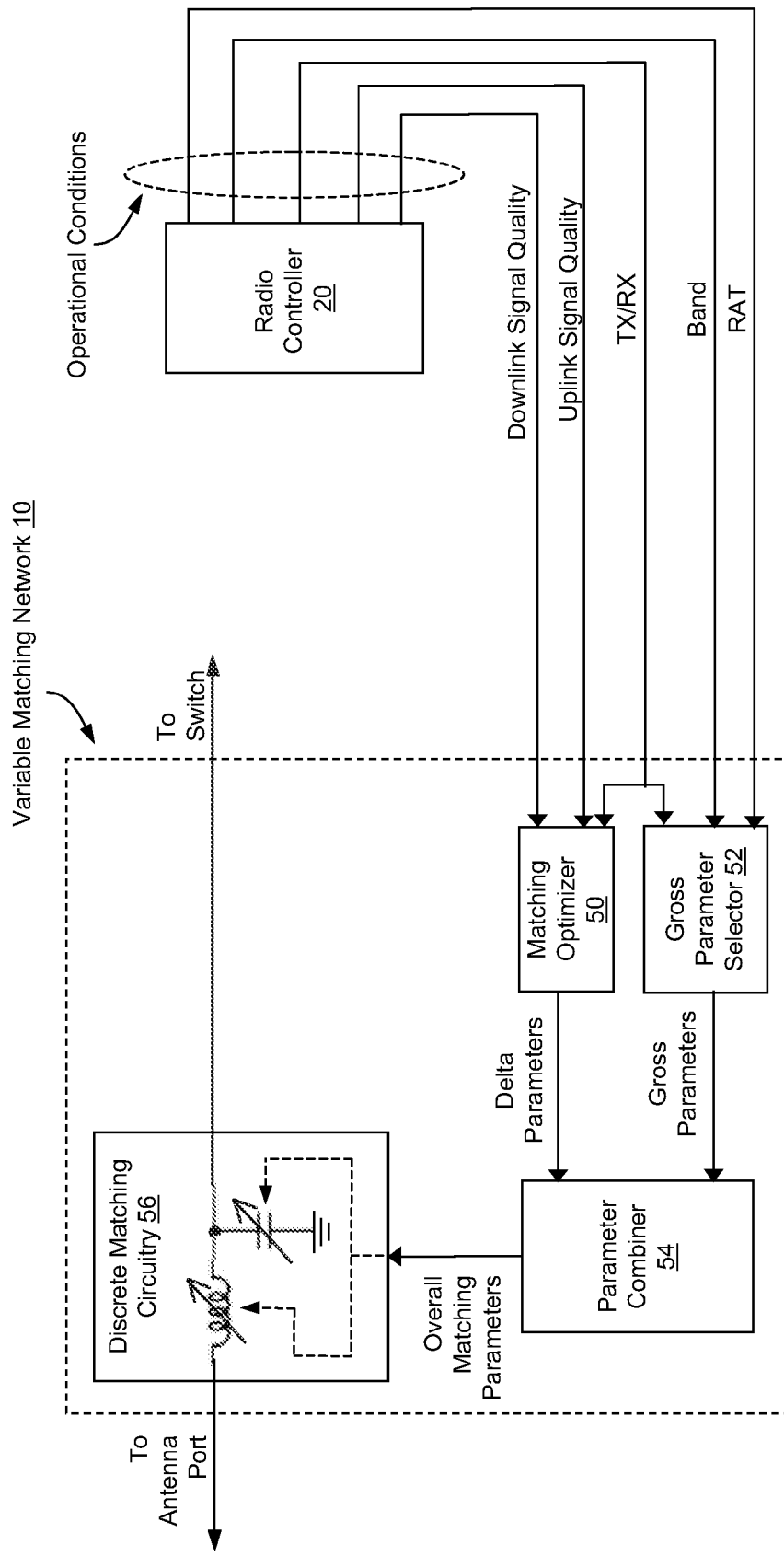
FIG. 2 is a schematic block diagram of a variable matching network in accordance with an embodiment of the present invention.

Referring now to FIG. 2, shown is the variable matching network 10. Based on operational conditions received from the radio controller 20, the variable matching network 10 provides dynamic fine-tune impedance matching between the antenna 14 and each of the signal paths 32, 34 leading to the amplifiers 42, 44. A well-known objective of a matching network is providing maximum power transfer at the RF antenna link (e.g., antenna port 16 shown in FIG. 1). Maximum power transfer is attained when the impedance of the antenna 14 matches the impedance of the signal path 32/34, or more particularly the corresponding amplifier 42, 44. In the process of obtaining maximum power transfer, however, conventional matching networks maximize the transfer of all signals at the RF antenna link, including interfering signals and noise. This degrades the quality of the desired signal. As discussed herein, the present invention provides a variable matching network 10 that maximizes the power transfer of the desired signal without compromising other aspects of the signal, including, e.g., noise figure (NF), bandwidth, voltage standing wave ratio (VSWR), signal gain, etc. For example, in one embodiment of the present invention, the variable matching network 10 provides dynamic fine-tune impedance matching that is optimized for signal quality.

As illustrated in FIG. 2, the variable matching network 10 includes a matching optimizer 50, a gross parameter selector 52, a parameter combiner 54, and discrete matching circuitry 56. The operation of each will be described in greater detail below.

The variable matching network 10 receives a control signal indicating current operational conditions from the radio controller 20. Operational conditions may include information received from the communications network 18 regarding the active frequency band (e.g., 850 MHz, 900 MHz, 1800 MHz, etc.) and the active RAT (e.g., GSM, WCDMA, LTE, etc.) for a given signal. The active frequency band and RAT may be determined based on, e.g., coverage, capacity, service requirements, etc., as is conventional. For GSM operation, operational conditions may include information indicating whether the radio circuit 12 is operating in a transmit mode or a receive mode. For WCDMA operation, the TX/RX information may not be provided because the WCDMA signal paths 32 are fully duplexed and therefore, may operate in both TX and RX modes at the same time.

In the illustrated embodiment, operational conditions include signal quality information. The signal quality information may be estimated using one or more known link quality measurements, including, e.g., signal-to-noise ratio (SNR), received signal strength indication (RSSI), bit error rate (BER), etc. The signal quality information may include information about downlink signal quality (e.g., receive signal quality) and/or uplink signal quality (e.g., transmit signal quality). The downlink signal quality may be estimated by the radio circuit 12. In one embodiment, the uplink signal quality is continuously estimated at the base station 24 and provided to the radio controller 12 by the base station 24 via continuous updates. In another embodiment, the uplink signal quality is derived from standard information received from the base station 24, such as, for example, power control information, code rate information, etc., as discussed above with reference to FIG. 1.

As illustrated in FIG. 2, the radio controller 20 provides the active frequency band, RAT, and TX/RX mode information to the gross parameter selector 52. Based on the received information, the gross parameter selector 52 selects gross matching parameters for tuning the components of the discrete matching network 56. The gross parameters are predefined to provide a tailored matching network for each possible combination of RAT, frequency band, and TX/RX mode. The gross parameters may be obtained from previous modeling and testing of the discrete matching circuitry 56 and may be stored in the gross parameter selector 52. The gross parameter selector 52 may include a look-up table that includes gross parameter entries for each possible combination of RAT, frequency band, and TX/RX mode. The use of a look-up table minimizes the computational time required to provide precise impedance matching, as will be appreciated.

As illustrated in FIG. 2, the radio controller 20 provides the downlink signal quality and the uplink signal quality information to the matching optimizer 50. Based on the received information, the matching optimizer 50 provides delta parameters to be used for fine-tuning the impedance matching provided by the discrete matching circuitry 56. The matching optimizer 50 may include an optimization algorithm for calculating optimal matching parameters for the discrete matching circuitry 56 based on the quality of a given signal (e.g., signal-to-noise ration (SNR), bit error rate (BER), etc.). Because the signal quality information may be continuously updated, e.g., by the base station 24 and/or by the radio controller 20, the matching optimizer 50 is able to dynamically provide the delta parameters. In one embodiment, the optimization algorithm may apply a priori knowledge to provide matching parameters that are optimized with regard to signal gain, voltage standing wave ratio (VSWR), noise figure (NF), bandwidth, etc.

In the illustrated embodiment, the radio controller 20 provides the active TX/RX mode to the matching optimizer 50, in addition to signal quality information. In this embodiment, based on the active TX/RX mode, the matching optimizer 50 selects either the uplink signal quality or the downlink signal quality information, as appropriate, and provides the selected information to the optimization algorithm for calculating optimal matching parameters for the discrete matching circuitry 56. For example, if the radio circuit 12 is operating in a transmit mode, the matching optimizer 50 provides the uplink signal quality information to the optimization algorithm for calculating an appropriate delta parameter. Similarly, if the radio circuit 12 is operating in a receive mode, the matching parameter 50 provides the downlink signal quality information to the optimization algorithm. In this manner, the matching optimizer 50 is able to fine-tune the matching parameters for a given operational state of the radio circuit 12.

As illustrated in FIG. 2, the parameter combiner 54 receives delta parameters from the matching optimizer 50 and gross parameters from the gross parameter selector 52. The parameter combiner 54 combines the delta parameters and the gross parameters in order to provide overall matching parameters to the discrete matching circuitry 56. In one embodiment, the parameter combiner 54 combines the overall matching parameters by using the delta parameters to fine-tune the gross matching parameters.

The discrete matching network 56 may include tunable components that may be adjusted based on the overall matching parameters received from the parameter combiner 54. In the illustrated example, the overall matching parameters are provided to a tunable inductor and a tunable capacitor. The overall matching parameters may be provided as a control signal that directs the each component to adjust its inductance or capacitance to a specified value indicated by the overall matching parameters, so as to provide the desired matching. The exemplary tunable capacitor and tunable inductor shown in FIG. 2 may represent more than one tunable capacitor and/or tunable inductor, as will be appreciated. In one embodiment, the discrete matching network 56 includes micro-electrical-mechanical systems (MEMS) technology to allow miniaturization of the discrete matching network 56. In other embodiments, the discrete matching circuitry 56 may be designed using lumped components or micro strips. FIG. 2 illustrates a typical matching network for a communications device including an inductor in parallel with a capacitor. The exact configuration of or components included in the discrete matching circuitry 56 is not particularly germane to the present invention. Accordingly, the present disclosure is intended to cover any combination of elements that create a matching network.

As will be appreciated, the discrete matching circuitry 56 may be tuned for only one matching network at a given time. For example, the impedance of the antenna 14 may only be matched to the impedance of one signal path 32/34 at a given time. When operating in a GSM mode, the variable matching network 10 is able to provide uncompromised, precise matching on each signal path 34 for each possible combination of RAT, frequency band, and TX/RX mode because each GSM frequency band has a separate TX path and a separate RX path. Thus, for any of the signal paths 34, the impedance matching may be precisely tailored according to the active operational conditions.

In conventional matching circuits, precise matching is not possible on the WCDMA side due to the full-duplex feature of the signal paths 32. Because only one impedance matching network may be provided at a given time, a given matching value may not provide perfect matching for both the TX mode and the RX mode. Typically, impedance matching on the WCDMA side is compromised between the TX and RX modes. For example, the gross matching parameters for signal path 32a are selected to be "in-between" a perfect matching with LNA 44a and a perfect matching with PA 42a. The present invention overcomes these conventional shortcomings by dynamically changing the basis for calculating the matching parameters when operating in a WCDMA mode so that precise matching may be provided for at least part, if not all, of the time.

In one such embodiment, the matching optimizer 50 may be configured to switch between optimizing the matching parameters based on the uplink signal quality and optimizing the matching parameters based on the downlink signal quality. The matching optimizer 50 may compare the uplink signal quality and the downlink signal quality to determine which "link" has the weaker signal quality and may perform the matching parameter optimization based on the weaker signal quality. The uplink and downlink signal quality estimations may be continuously provided to the matching optimizer 50, as described above. For example, if the matching optimizer 50 determines that the uplink signal quality is weaker, the optimization algorithm calculates delta parameters based on the uplink signal quality. If, with time, the downlink signal quality becomes weaker than the uplink signal quality, the matching optimizer 50 may switch to optimizing the matching parameters based on the downlink signal quality. In at least the above manner, the matching optimizer 50 is able to dynamically alter the delta parameters to provide precise matching for the weaker link at any given time during WCDMA operation.

In another embodiment, during WCDMA operation, the variable matching network 10 may switch between providing perfect matching for the TX mode and providing perfect matching for the RX mode. The radio controller 20 may provide a control signal (e.g., on the TX/RX line in FIG. 2) to the gross parameter selector 52 that directs the variable matching network 10 when to match based on the TX mode and when to match based on the RX mode. Based on the control signal received from the radio controller 20, the gross parameter selector 52 may select gross parameters corresponding to the selected TX/RX mode. In one embodiment, the radio controller 20 utilizes a fifty percent (50%) duty cycle for switching between matching for the TX mode and matching for the RX mode. According to this embodiment, the variable matching network 10 matches the antenna impedance to the impedance of one of LNAs 44*a*, 44*b*, 44*c* for one half period and matches the antenna impedance to the impedance of one of PAs 42*a*, 42*b*, 42*c* for the next half period, and so on. In at least the above manner, the variable matching network 10 may minimize the impedance mismatch caused by duplexing transmit and receive signals onto one TX/RX signal path 32.

The variable matching network 10 may be fabricated on one or more integrated circuits (ICs). The various components listed above and included in the radio circuit 12 may be fabricated on the same IC or on one or more separate but connected ICs. All switches included in the radio circuit 12 may be based on any type of technology including, e.g., GaAs, pHEMT, CMOS, MEMS, etc.

Figure 3:
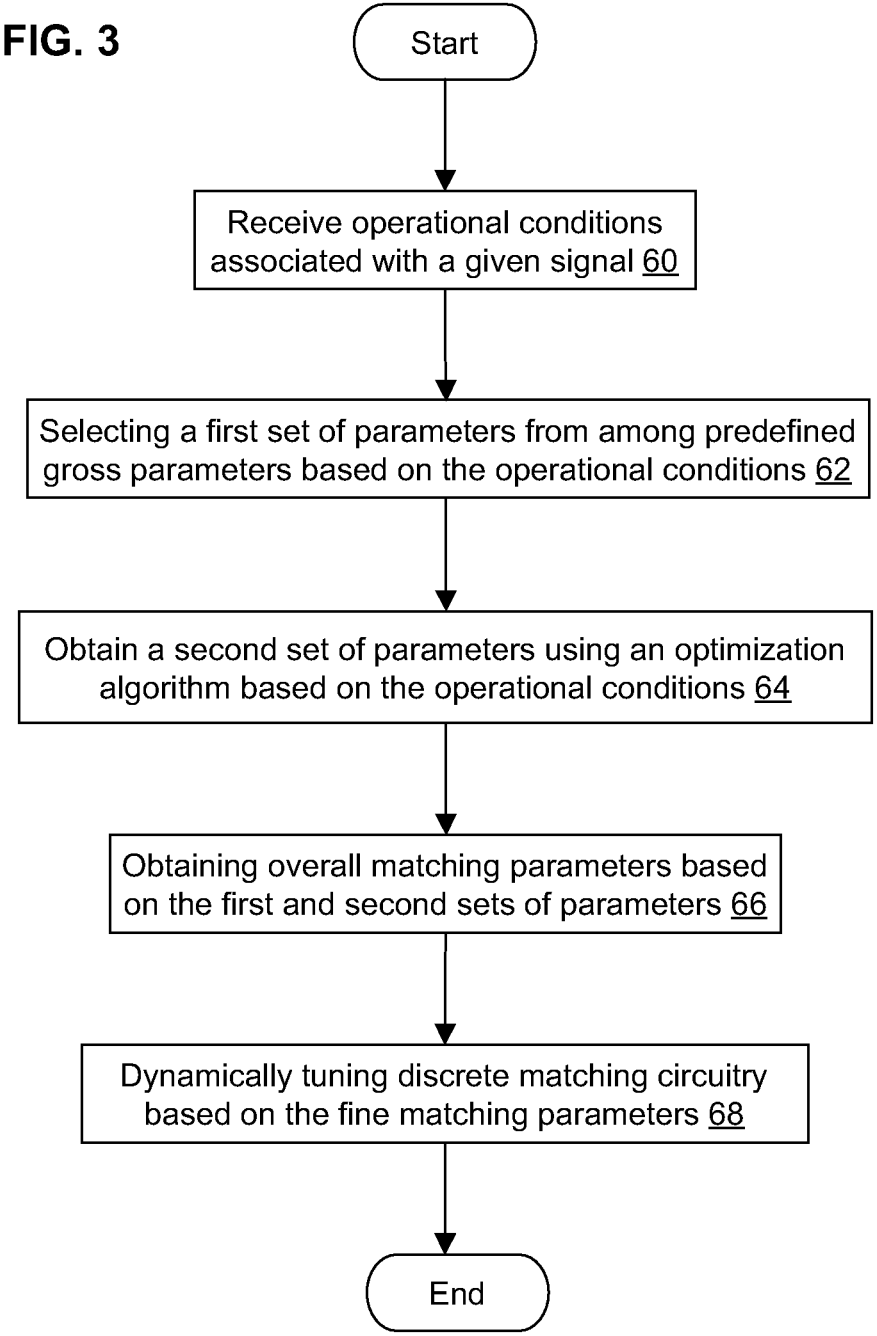
FIG. 3 is a flowchart of a method of providing dynamic, fine-tune impedance matching in accordance with an embodiment of the present invention.

With additional reference to FIG. 3, illustrated are logical operations to implement an exemplary method of providing dynamic, fine-tune impedance matching in a multi-band, multi-mode communications device. The exemplary method may be carried out using an embodiment of the variable matching network 10, for example. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for providing dynamic, fine-tune impedance matching may begin in block 60 where operational conditions associated with a given signal are received. As described above, the operational conditions may include information regarding the frequency band, RAT, and TX/RX modes associated with the given signal, as well as the quality of the signal.

In block 62, a first set of parameters may be selected from among a plurality of predefined gross parameters based on the operational conditions. The gross parameters may be predetermined for each possible combination of RAT, frequency band, and TX/RX mode, as described above. The gross parameters may be selected by using a look-up table for matching a specific combination of operational conditions to corresponding gross parameters entries. The operational conditions used for selecting the first set of parameters may include the active RAT, frequency band, and TX/RX mode.

In block 64, a second set of parameters may be obtained using an optimization algorithm based on the operational conditions. The operational conditions used for obtaining the second set of parameters may include signal quality (e.g., uplink signal quality and/or downlink signal quality) and the active TX/RX mode, as described above.

In block 66, overall matching parameters are obtained based on the first and second sets of parameters. In one embodiment, the overall matching parameters are obtained by using the second set of parameters to fine-tune the first set of parameters.

In block 68, the discrete matching circuitry is dynamically tuned based on overall matching parameters. As described above, the discrete matching circuitry may include tunable components that may be adjusted using the overall matching parameters.

The above disclosure of the present invention provides dynamic, fine-tune matching based on operational conditions associated to a given signal. In particular, the dynamic, fine-tune matching is provided by continuously adjusting the matching parameters based on the active RAT, frequency band, and TX/RX mode and continuously optimizing the matching parameters based on a corresponding signal quality. In addition, the variable matching network 10 is able to overcome the impedance mismatch caused by duplexers required for WCDMA operation by dynamically switching the basis for calculating the matching parameters so as to provide precise matching for at least part of the time.

Figure 4:
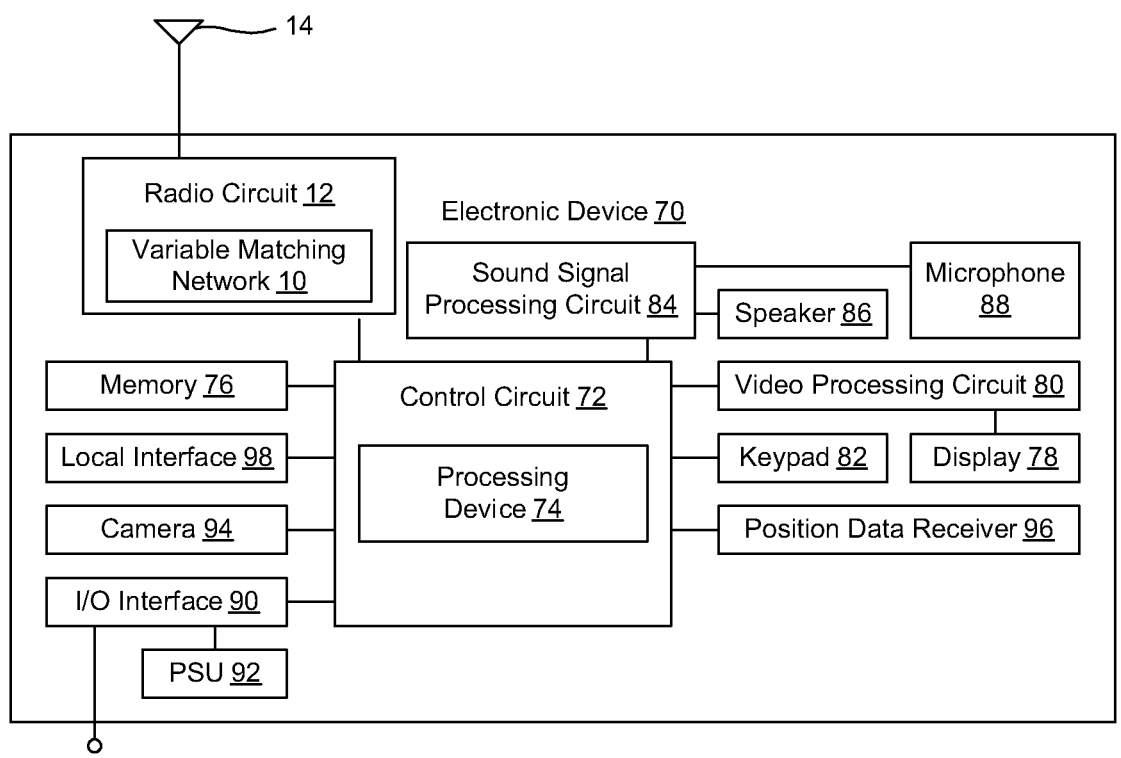
FIG. 4 is a schematic block diagram of an electronic device that includes a variable matching network in accordance with an embodiment of the present invention.
Figure 5:
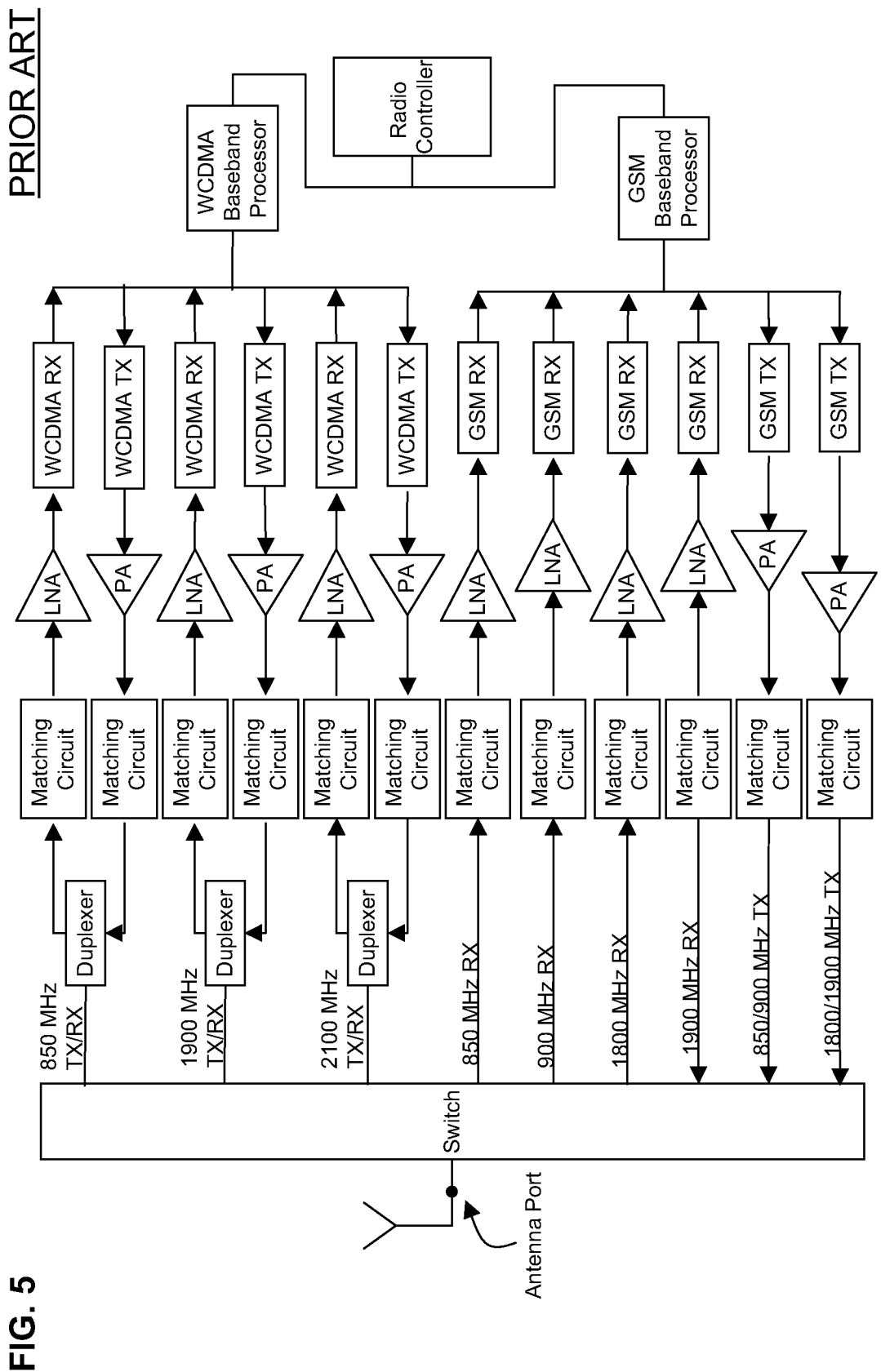
FIG. 5 is a schematic block diagram of a conventional radio circuit in an electronic device.
Figure 6:
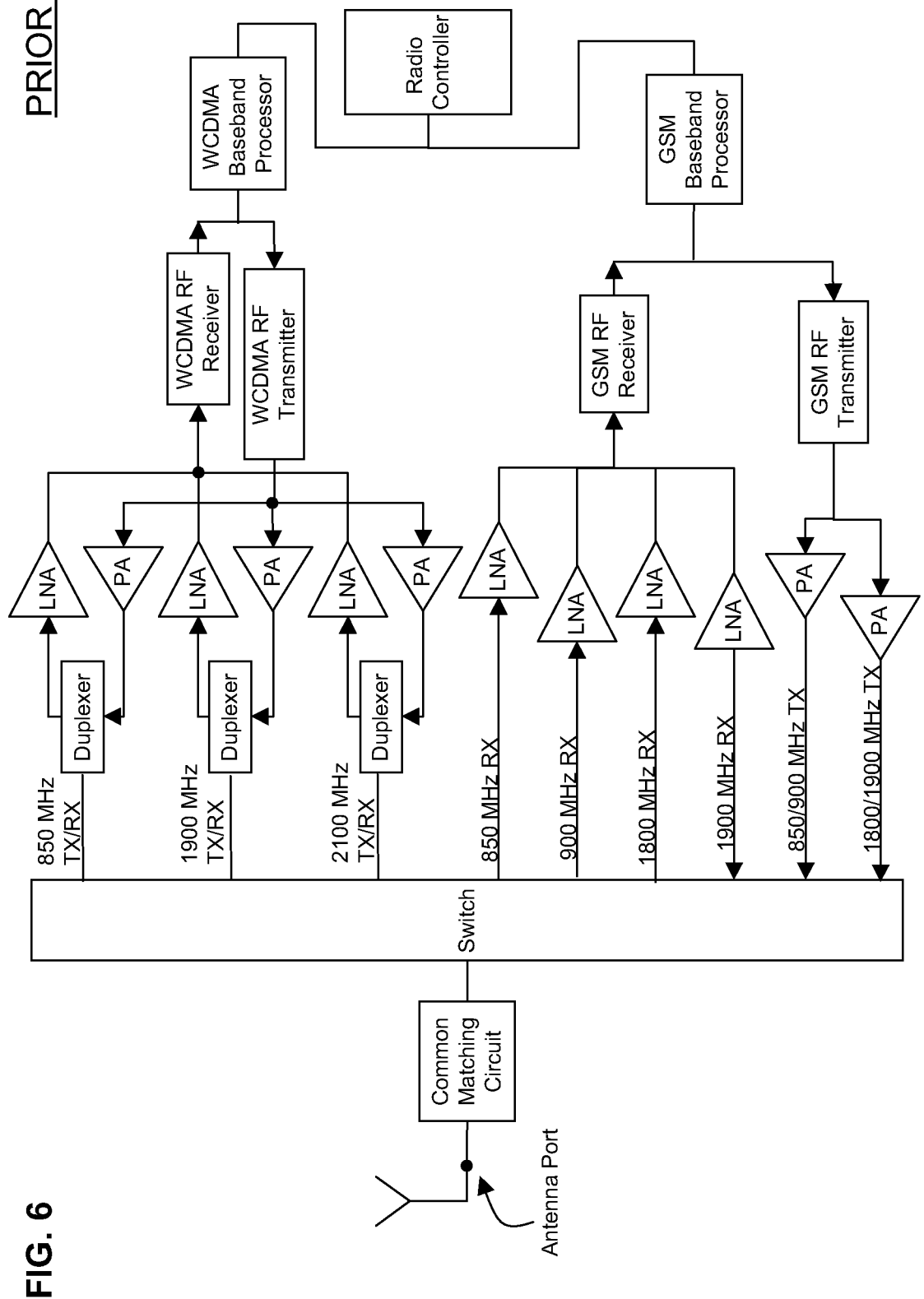
FIG. 6 is schematic block diagram of another conventional radio circuit in an electronic device.

Referring now to FIG. 4, shown is an electronic device 70 including the variable matching network 10. The electronic device of the illustrated embodiment may be a communications device, such as a mobile telephone, and will be referred to as the communications device 70. For the sake of brevity, many features of the communications device 70 will not be described in great detail.

In the illustrated embodiment of FIG. 4, the variable matching network is included within the radio circuit 12, which is coupled to the antenna 14. The radio circuit 12 may support the communications activity of the communications device 70. For example, the radio circuit 12 may enable the communications device 70 to establish a call and/or exchange signals with another device over the communications network 18 (FIG. 1) via the antenna 14. For instance, the other device may be another mobile telephone or a landline telephone. However, the other device need not be another telephone, but may be some other device such as an Internet web server, a content providing server, a computer, etc. Calls may take any suitable form. For example, a call could be a conventional voice call, a voice over Internet Protocol (VoIP) call, a video enabled call, etc. In addition to engaging in calls, the communications device 70 may be configured to transmit, receive and/or process data, such as text messages, instant messages, electronic mail messages, multimedia messages, data files, image files, video files, audio files, ring tones, streaming audio, streaming video, data feeds (including podcasts and really simple syndication (RSS) data feeds), Internet content, and so forth. It will be appreciated that the antenna 14 and the radio circuit 12 may represent one or more than one antenna 14 and radio circuit 12.

The communications device 70 may include a primary control circuit 72 that is configured to carry out overall control of the functions and operations of the communications device 70. The control circuit 72 may include a processing device 74, such as a central processing unit (CPU), microcontroller, or microprocessor. The processing device 74 executes code stored in a memory (not shown) within the control circuit 72 and/or in a separate memory, such as a memory 76, in order to carry out operation of the communications device 70. The memory 76 may be, for example, one or more of a buffer, a flash memory, a hard drive, a removable media, a volatile memory, a non-volatile memory, a random access memory (RAM), or other suitable data storage mechanism. In a typical arrangement, the memory 76 may include a non-volatile memory for long term data storage and a volatile memory that functions as system memory for the control circuit 72.

In one embodiment, the control circuit 72 may include the radio controller 20 (FIGS. 1 and 2). The processing device 74 may process communication functions for the radio controller 20. For example, the processing device 74 may receive information from the communications network 18 via the antenna 14 regarding which RAT and frequency band is being used for a receive signal or is available for use for a transmit signal. The processing device 74 may present this information in the form of control signals to the components of the radio circuit 12 whose functions are dependent on the chosen RAT and frequency band. For example, the control signals may direct the switch 30 (FIG. 1) to connect the antenna port 16 to the signal path 32/34 that corresponds to the active RAT and frequency band for a given signal. As another example, the processing device 74 may provide these control signals to the variable matching network 10 in the form of operational conditions (FIGS. 1 and 2). The processing device 74 may execute code to implement the communication functions. It will be apparent to a person having ordinary skill in the art of computer programming, and specifically in application programming for mobile telephones or other electronic devices, how to program a communication device 70 to operate and carry out logical functions associated with these communication functions. Accordingly, details as to specific programming code have been left out for the sake of brevity. Also, while the stated communication functions are executed by the processing device 74 in accordance with an exemplary embodiment of the present invention, such functionality could also be carried out via dedicated hardware or firmware, or some combination of hardware, firmware and/or software.

The electronic device may include a display 78 to visually display information to a user. The display 78 may be coupled to the control circuit 72 by a video processing circuit 80 that converts video data to a video signal used to drive the display 78. The video processing circuit 80 may include any appropriate buffers, decoders, video data processors and so forth.

A keypad 82 and/or other user input devices (e.g., a touch sensitive surface of the display 36, a navigation input device, etc.) may be present to provide for a variety of user input operations.

The communications device 70 further includes a sound signal processing circuit 84 for processing audio signals transmitted by and received with the communications device 70. Coupled to the sound processing circuit 84 are a speaker 86 and a microphone 88 that enable a user to carryon voice communication (e.g., a telephone call or a push-to-talk conversation) with a user of a remote device via the communications network 18 (FIG. 1). The sound processing circuit 84 may include any appropriate buffers, decoders, amplifiers and so forth.

The communications device 70 may further include one or more input/output (I/O) interface(s) 90. The I/O interface(s) 90 may be in the form of typical mobile telephone I/O interfaces and may include one or more electrical connectors. As is typical, the I/O interface(s) 90 may be used to couple the communications device 70 to a battery charger to charge a battery of a power supply unit (PSU) 92 within the communications device 70. In addition, or in the alternative, the I/O interface(s) 90 may serve to connect the communications device 70 to a headset assembly (e.g., a personal handsfree (PHF) device) that has a wired interface with the communications device 70. Further, the I/O interface(s) 90 may serve to connect the communications device 70 to a personal computer or other device via a data cable for the exchange of data. The communications device 70 may receive operating power via the I/O interface(s) 90. The PSU 92 may supply power to operate the communications device 70 in the absence of an external power source.

The communications device 70 may include a camera 94 for taking digital pictures and/or movies. Image and/or video files corresponding to the pictures and/or movies may be stored in the memory 76.

The communications device 70 also may include a position data receiver 96, such as a global positioning system (GPS) receiver, Galileo satellite system receiver or the like. The position data receiver 96 may be involved in determining the location of the communications device 70.

The communications device 70 also may include a local wireless interface 98, such as an infrared transceiver and/or an RF interface (e.g., a Bluetooth interface), for establishing communication with an accessory, another mobile radio terminal, a computer or another device. For example, the local wireless interface 98 may operatively couple the communications device 70 to a headset assembly (e.g., a PHF device) in an embodiment where the headset assembly has a corresponding wireless interface.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A variable matching network for use in a multi-band, multi-mode communications device, comprising:

a gross parameter selector configured to select a first set of parameters for impedance tuning tunable components of the variable matching network from a plurality of predefined gross parameters based on one or more operational conditions associated with a given signal;

a matching optimizer configured to obtain a second set of delta parameters for adjusting the first set of parameters using an optimization algorithm based on one or more of the operational conditions;

a parameter combiner configured to obtain overall matching parameters by adjusting the first set of parameters based on the second set of parameters; and discrete matching circuitry including the tunable components configurable based on the overall matching parameters to provide dynamic, fine-tune impedance matching.

2. The variable matching network of claim 1, wherein the one or more operational conditions on which the first set of parameters is based includes a selected radio access technology, a selected frequency band, and a selected one of a transmitting mode or a receiving mode.

3. The variable matching network of claim 1, wherein the one or more operational conditions on which the second set of parameters is based includes information pertaining to signal quality and a selected one of a transmitting mode or a receiving mode.

4. The variable matching network of claim 3, wherein the signal quality information includes at least one of an uplink signal quality or a downlink signal quality.

5. The variable matching network of claim 4, wherein the matching optimizer compares the uplink signal quality and the downlink signal quality to determine which link is weaker, and optimizes the second set of parameters based on the signal quality of the weaker link.

6. The variable matching network of claim 2, wherein at least one predefined gross parameter is assigned to each possible combination of frequency band, radio access technology, and transmitting/receiving mode.

7. The variable matching network of claim 2, wherein the gross parameter selector selects the first set of parameters based on the transmitting mode for one time period and selects the first set of parameters based on the receiving mode for a next time period.

8. The variable matching network of claim 1, wherein the operational conditions are continuously updated.

9. A method of providing fine-tune impedance matching at an antenna port of a multi-band, multi-mode communications device, comprising:

receiving operational conditions associated with a given signal;

selecting a first set of parameters for impedance tuning tunable components of matching circuitry from a plurality of predefined gross parameters based on one or more of the operational conditions;

obtaining a second set of delta parameters for adjusting the first set of parameters using an optimization algorithm based on one or more of the operational conditions;

obtaining overall matching parameters by adjusting the first set of parameters based on the second set of parameters; and dynamically tuning discrete matching circuitry including the tunable components based on the overall matching parameters.

10. The method of claim 9, wherein the one or more operational conditions on which the first set of parameters is based includes a selected radio access technology, a selected frequency band, and a selected one of a transmitting mode or a receiving mode.

11. The method of claim 9, wherein the one or more operational conditions on which the second set of parameters is based includes information pertaining to signal quality and a selected one of a transmitting mode or a receiving mode.

12. The method of claim 11, wherein the signal quality information includes at least one of an uplink signal quality or a downlink signal quality.

13. The method of claim 12, wherein obtaining a second set of parameters includes:
    comparing the uplink signal quality and the downlink signal quality to determine which link is weaker; and
    optimizing the second set of parameters based on the signal quality of the weaker link.

14. The method of claim 10, wherein at least one predefined gross parameter is assigned to each possible combination of frequency band, radio access technology, and transmitting/receiving mode.

15. The method of claim 10, wherein selecting a first set of parameters includes:
    for one time period, selecting the first set of parameters based on the transmitting mode; and
    for a next time period, selecting the first set of parameters based on the receiving mode.

16. The method of claim 9, wherein the operational conditions are continuously updated.

* * * * *